No. 820,953. PATENTED MAY 22, 1906.
W. CHATER.
COMBINED MATCH RECEPTACLE AND IGNITER.
APPLICATION FILED OCT. 12, 1905.

Witness
T. M. Stump
Hannah P. Seymour

Inventor
Wm. Chater
by
Attorney

No. 820,953. PATENTED MAY 22, 1906.
W. CHATER.
COMBINED MATCH RECEPTACLE AND IGNITER.
APPLICATION FILED OCT. 12, 1905.

Inventor
Wm. Chater
by
Attorney

Witness

No. 820,953. PATENTED MAY 22, 1906.
W. CHATER.
COMBINED MATCH RECEPTACLE AND IGNITER.
APPLICATION FILED OCT. 12, 1905.

WITNESSES:

INVENTOR.
Wm. Chater
ATTORNEY.

No. 820,953. PATENTED MAY 22, 1906.
W. CHATER.
COMBINED MATCH RECEPTACLE AND IGNITER.
APPLICATION FILED OCT. 12, 1905.

Inventor
Wm. Chater

UNITED STATES PATENT OFFICE.

WILLIAM CHATER, OF DENVER, COLORADO.

COMBINED MATCH RECEPTACLE AND IGNITER.

No. 820,953.  Specification of Letters Patent.  Patented May 22, 1906.

Application filed October 12, 1905. Serial No. 282,464.

*To all whom it may concern:*

Be it known that I, WILLIAM CHATER, a citizen of the United States of America, residing at Denver, in the county of Denver and State of Colorado, have invented certain new and useful Improvements in a Combined Match Receptacle and Igniter, of which the following is a specification.

My invention relates to improvements in match-receptacles, its object being to provide a device which being highly ornamental in appearance will store a quantity of matches and by simple manipulation remove them, one at a time, from the receptacle, ignite the separated match, and serve it in a burning condition to the operator.

To render the apparatus attractive and ornamental as well as useful, I conceal the front of the operating mechanism by a preferably basso-rilievo representation of some familiar or picturesque scene made of plaster-of-paris or other suitable material and having an alto-rilievo figure of an animated, preferably human, being in the foreground. The match-serving member of the mechanism is in this case connected with one of the limbs of the statuette, so that when the device is operated the being represented appears to take the burning match from some hiding-place and hands it to the operator.

The device, as shown in the drawings, represents a mountain scene with a grotto in the center. A hunter is seated on a piece of rock on the right of the grotto and holds in his left hand a suitable implement, with which when the device is operated he apparently takes a burning match out of the grotto and bringing it forward hands it to the operator who stands in front of the device.

I attain my objects by the mechanism illustrated in the accompanying drawings, in the various views of which like parts have been similarly designated, and in which—

Fig. 4, an enlarged vertical section taken along a line 4 4, Fig. 2, looking in the direction of arrow *a; * Fig. 5, a similar section taken along line 5 5, Fig. 2, looking in the direction of arrow *c; Fig. 15, an enlarged horizontal section through the igniting member and adjacent portions of the main frame; Fig. 16, a horizontal section through the sliding carriage.

Referring to the drawings, let 6 represent a stationary base or platform, rigidly secured to which is the vertically-extending frame or standard 7, consisting of a vertical oblong plate 8, having rearwardly-extending sides or flanges 9. Rigidly secured at points 12 and 15 to the front of plate 8 and spaced therefrom are two flat bars 11 and 11, extending in parallel relation to frame 7 from its uppermost edge to a point a suitable distance above base 6. Bars 11, the lower extremities of which curve outwardly from plate 8, are connected at their upper ends by a round rod 16, which is adapted to movably support the match-receptacle and which terminates in suitably bent lugs 17 and 17, by which bars 11 are connected to the main frame. The bars are furthermore joined by two intermediate transverse braces 18 and 19, the upper one, 18, of which extends outwardly to furnish a fulcrum 20 for a lever 21, hereinafter to be described, while the lower one, 19, extending in opposite direction, has an inwardly-bent lug by which it is secured to a parallel arm 22 on the main frame 7. The extension of brace 19 with arm 22 form a guide for the reciprocating igniter 23, hereinafter to be described.

24 designates the match-receptacle movably extending along the rear surface of plate 8 in between flanges 9 and divided into two compartments 25 and 26 by a vertically-extending partition 27. Chambers 25 and 26 communicate below this partition which terminates a suitable distance above the downwardly-slanting bottom plate 28, the flanged edge 29 of which rests normally against plate 8. A slide 30, resting on the bottom plate and having a handpiece 30$^a$ extending through a slot 28$^a$, is adapted to agitate and rearrange the matches deposited in the receptacle if by reason of their being displaced the apparatus fails to work. Receptacle 24 is reciprocally movable, being fulcrumed on the main frame by means of hook-shaped straps 31 on the upper and forwardly-ranging extension 32$^a$ of the top plate 32 of the receptacle which engage the above-named rod 16. Access to chamber 26 may be had by means of the back plate 33, which is vertically slidable along the outturned edges 34 of the side plates of the receptacle. Plate 33 is normally held in place by a hook 35 engaging the upper surface of top plate 34. The rearward movement of box 24 is limited by means of an inwardly-extending arm 36, the hook-shaped extremity of which engages a knob 37 on the adjacent flange 9, while a spring 38, secured to the main frame and engaging a wire arm 39 on the box, tends to keep flange 29 in contact with plate 8.

The matches are deposited in compartment 26 of the box by removing slide 33, while a limited number will pass along the inclined bottom 28 underneath partition 27 into the inner compartment 25, where they are engaged and held from contact with plate 8 by two leaf-springs 40, which extend in correspondingly-shaped vertically-extending parallel channels 41, cut in the rear surface of the plate. The upper extremities of springs 40 being secured at 42 to the plate, the lower ends curve outwardly therefrom and projecting through notches 29$^a$ in flange 29 of the box tend to keep said flange from engagement with plate 8, while simultaneously preventing the matches from dropping out of compartment 25.

The principal operations of the device—viz., removing a single match from the box, igniting same, and depositing the burned match in front of the apparatus—are performed through instrumentality of a sliding carriage having a vertical reciprocating movement along the frame and which will now be described.

The carriage consists of two members 43 and 44, rigidly connected by bolts 45, and which in practice are disposed, respectively, along the rear and front surfaces of plate 8. The rear member 43 consists of a downwardly-tapering or wedge-shaped plate 46, the flat upper edge of which being provided with an upwardly-extending flange 47 is purported to carry a match from the match-receptacle upwardly to the top of the frame. An integral inwardly-bent projection 48 on the member is placed contiguous to a corresponding portion of the front member for fastening purposes. Member 44 of the carriage consists, primarily, of stationary and movable jaws 49 and 50, which receiving the match as it leaves member 43 are adapted to hold it and carry it downwardly. The sliding carriage is guided during its vertical reciprocating movement by two sleeves 51, which form part of a vertical arm 52, which extending parallel to the two members composing the carriage is connected to member 44 by an integral intermediate plate 53. Sleeves 51 in practice surround the vertically-disposed guide-rod 54, which is rigidly secured between an arm 55, extending outwardly from the top of frame 7, and a corresponding extension 56 on its base. An outwardly-extending handle 57, made integral to arm 52, facilitates operating the apparatus.

Revolubly secured to the side or flange 9 of plate 8, extending adjacent to guide-rod 54, are two integral grooved pulleys or sheaves, the larger one, 58, of which is connected with the lower sleeve 51 of the carriage by a rope 59 passing around its periphery, while a similar rope 60, secured to and passing in opposite direction around the periphery of the smaller pulley 61, connects with a coil-spring 62, the opposite extremity of which is secured to base 6 at 63.

When the carriage is moved downward, rope 59 unwinding causes pulleys 58 and 61 to rotate, with the result that rope 60, being simultaneously wound around sheave 61, extends spring 62, and when the pressure on handle 57 is released the contraction of the spring will cause the carriage to resume its original or highest position.

Having thus briefly and in a general way described the principal elements of my device, I will now proceed to define same in detail, together with coöperating parts, while explaining the operation of the apparatus.

A quantity of matches having been deposited in compartment 26 of the match-receptacle, a limited number of which pass underneath partition 27 into compartment 25 and against springs 40, the device is ready for use. To procure a match from box 24 and ignite the same, the operator moves the sliding carriage, which normally is at the top of the device, down by depressing handle 57.

Figures 8, 13:
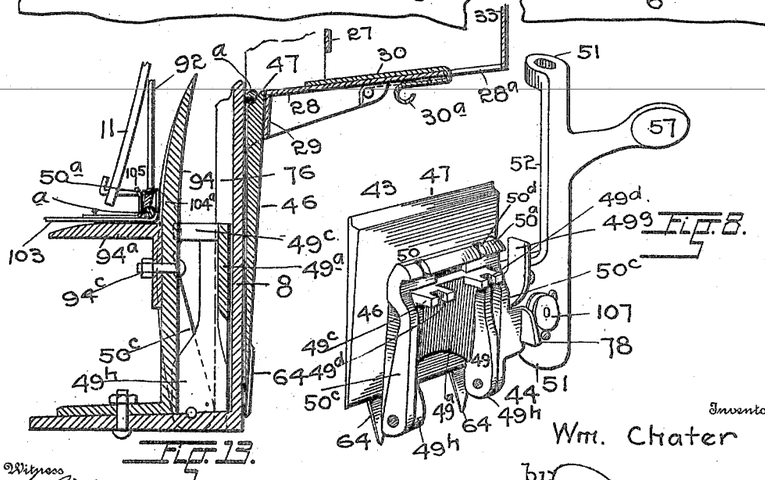
* Fig. 8, a perspective view of the sliding carriage.
Fig. 13, an enlarged vertical section taken along the line 13 13, Fig. 11.
Figure 9:
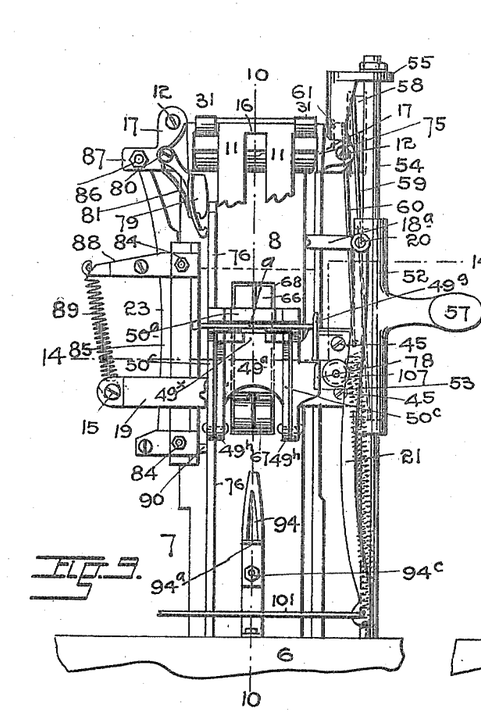
Fig. 9, a fragmentary front view of the structure, showing the carriage in the middle of the device on its downward way while igniting the match.
Figure 10:
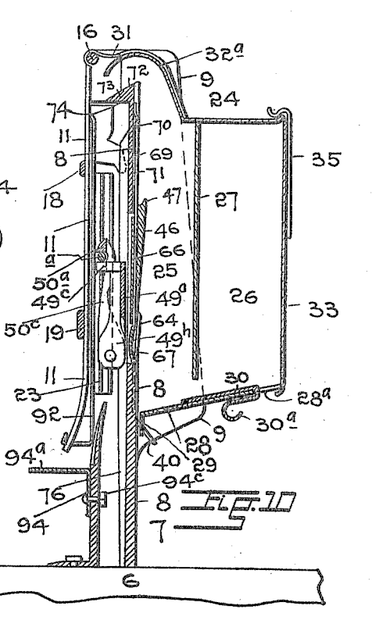
Fig. 10, a vertical section taken along the line 10 10, Fig. 9.
Figure 11:
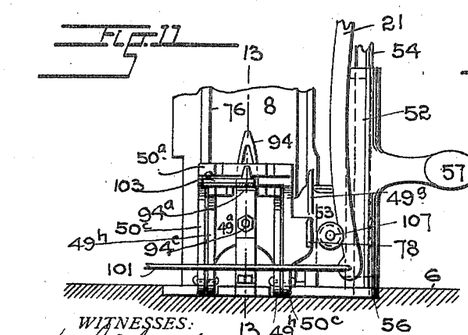
Figs. 11 and 12, respectively, fragmentary front and rear views of the lower portion of the device, the carriage being in its lowermost position.
Figure 12:
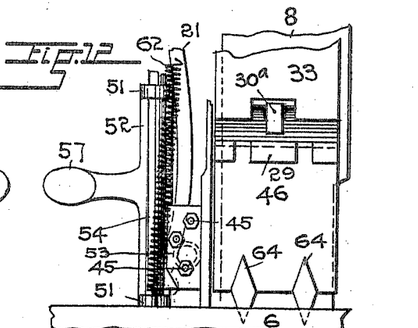

The rear member of the carriage, which, as heretofore described, consists of a wedge-shaped plate 46, moves in contiguous relation to the rear surface of plate 8 and is provided at its lower edge with two flat pointed fingers 64, which extending over channels 41 in the plate in the path of springs 40 press the latter inwardly into the channels and clear the way for the downwardly-moving tapering plate 46 to pass between the springs and plate 8 and the matches contained in the inner compartment 25. When the carriage has reached its lowest position, (see Figs. 11, 12, and 13,) the upper edge of flange 47 extends on a line with or slightly below the lower edge of the slanting bottom plate 28, thus permitting a match to drop onto the upper surface of plate 46 and in between flange 47 and the rear surface of plate 8, to be carried upwardly to the top of standard 7, when the carriage returns to its original or uppermost position. As it is essential that but one match should be carried upwardly, I have provided a trip 65, purported to remove superfluous matches from the top of plate 46. This trip consists of two plates 66 and 67, the lower outwardly-curving one, 67, of which is pivoted at its lower extremity in a slot 68 in plate 8, while its upper edge is hinged to the adjacent extremity of the upper plate 66 by means of the outwardly-bent extremities of a looped wire 69, which being rigidly secured to the plate extends beyond its upper edge to pass through a strap 70, secured in a recess 71 of plate 8.

When in its normal position, loop $71^a$ of wire 71 rests in the lower part of the oblong strap 70, and the adjacent ends of the two plates protrude beyond the surface of plate 8 and in the path of plate 46, so that when the latter travels upwardly any matches resting upon the match deposited on plate 46 and in front of flange 47 will be engaged by the curved plate 67 and impelled outwardly to drop on top of the other matches in compartment 25. During further upward movement of the carriage both plates, as well as wire 69, are impelled to recede into slot 68 and recess 71 and out of the path of plate 46. When the carrier has reached its uppermost or original position, (see Figs. 2, 3, 4, and 5,) the upper surface of the tapering plate 46 extends slightly above the upper edge of plate 8, which has been provided with a downwardly-ranging inclined plane 72, formed by a forwardly-projecting integral triangular lug 73, the lower surface 74 of which extends at right angles to the face of plate 8. The jar caused by the carrier impinging the stationary standard when it has reached its uppermost position will cause the match to pass from the upper surface of plate 46 along the inclined surface of lug 73 to fall upon the stationary lower jaw 49 of member 44 of the carrier, which will now be described in detail.

Member 44 of the sliding carrier consists of a stationary plate $49^a$, being a continuation of plate 53 heretofore described and having at its upper extremity two outwardly-extending lugs $49^c$, which together form the stationary lower jaw of the match-holding appliance. These projections are provided with vertical notches $49^d$, the function of which will hereinafter be described.

The movable member 50 of the appliance consists of a hook-shaped jaw $50^a$, in practice extending above the stationary jaw and having two downwardly-extending arms $50^c$, the lower extremities of which are pivotally connected to downwardly-extending lugs $49^h$ on the stationary member 49. Jaw $50^a$ is also provided with vertical notches $50^d$, which in practice are in alinement with those on jaw $49^a$. A stop $49^g$, forming part of plate 43, arrests further upward movement by engaging a ridge 75 on the stationary frame when the carrier has reached its highest position.

Figure 17:
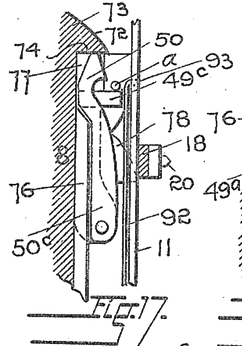
Figs. 17, 18, 19, and 20, side views of the sliding carriage and adjacent portions of the frame, the carriage having been illustrated to consecutively occupy the following positions: uppermost, receiving the match, Fig. 17, carrying the match downwardly, Fig. 18, releasing the match, Fig. 19, and lowermost, depositing the match, Fig. 20.

To receive, hold, and release the match during the subsequent operations of the device, as will hereinafter be described, the fulcrumed movable jaw moves back and forth at certain intervals through instrumentality of a vertical rail 76, made integral with plate 8 and extending in the path of the adjacent arm $50^c$ of the movable member 50 of the carrier. The lower extremity of the rail tapers slightly toward the base of the device, while its upper end terminates a certain distance below the top of the device, leaving a recess 77, adapted to receive the upper rearwardly-protruding portion of member 50. (See Fig. 17.) An outwardly-projecting cam 78 on member 50 is designed to engage during upward movement of the carrier the extension $18^a$ of the intermediate transverse brace 18 on bars 11 for the purpose of forcing the movable jaw backward into recess 77 when the carriage has reached its uppermost position.

Figure 18:
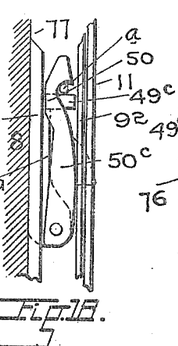

To continue the explanation of the operation of my apparatus, the carriage having reached its uppermost position, the match which had passed from the top of the plate 46 along inclined plane 72 falls upon the projections $49^c$ of the stationary member 49, the movable hook-shaped jaw $50^a$ having been forced into recess 77 and below lug 73 out of the path of the match, as mentioned heretofore. (See Fig. 17.) During subsequent downward movement of the carrier cam 78 disengages the projection $18^a$, and the lower surface of the rearwardly-projecting head of member 50 engages the face of rail 76, with the result that jaw $50^a$ of the member is forced forward over the match deposited on the stationary jaw. (See Fig. 18.) The head of the match is at the same time brought in alinement with the igniter 23 by engaging a stop 79, fulcrumed at 80 to the stationary frame and resiliently held in its normal position by a spring 81. This element of my apparatus comprises a tempered-steel plate 82, having a serrated edge 82ª and placed between two outwardly-flaring guide-plates 83. The three plates being held in relative position by bolts 84 are secured to a bar 85, the upper extremity of which is fulcrumed at 86 to a lug 87 on the main frame. Bar 85 has an arm 88 projecting at right angles thereto and connected to the before-named lug 22 of the main frame by a coil-spring 89, which arrangement establishes a resilient or yielding contact between the head of the match held between the jaws on the downwardly-moving carrier and the serrated edge 82ª, which extends in its path. The inward- and-outward movement of bar 85 is limited by two stops 90 and 91, respectively, adapted to engage the outer edge of rail 76 and the inwardly-bent extremity of brace 19. It will be observed that the arrangement of parts as described permits ready removal of the igniting-plate 82 for cleaning or renewal by unhooking bar 85 from bolt 87, unfastening spring 89, and detaching one of the guide-plates by loosening bolts 84. Forward movement of the match when the carriage is propelled downwardly is prevented by two wire springs 92, extending along the inner surfaces of the vertically-extending bars 11, their upper extremities being secured thereto at 93, while their free hook-shaped lower ends project through notches 11ª, cut in the lower edges of the bars. Springs 92, spaced from arms 11, being thus free to move back and forth, are placed in alinement with and are capable of entering the heretofore-referred-to notches 50ᵈ and 49ᵈ in the jaws of members 50 and 49 of the carriage, which arrangement allows the springs to more firmly hold the match in position by engaging its outer surface. The friction between the head of the downwardly-moving match and the serrated edge of the yieldingly-held igniting-bar 82 will cause the former to become ignited, and the match is in this condition when the carriage has again reached its lowermost position, at which period the burning match is automatically removed from between jaws 49ᶜ and 50ª, to be deposited in a suitable receptacle or into a serving appliance, which will hereinafter be described.

Figure 14:
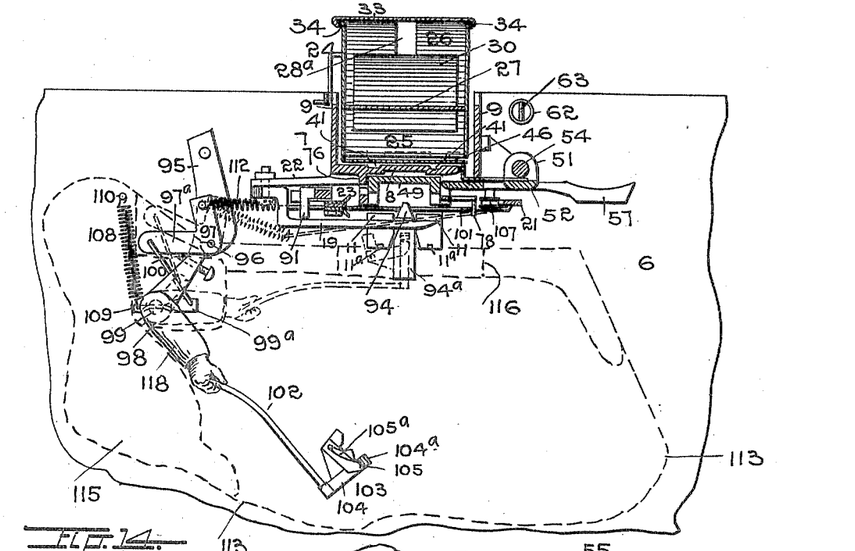
Fig. 14, a horizontal section taken along a line 14 14, Fig. 9, part of the base having been omitted, while the position of the ornamental front has been shown in broken lines. The serving-arm in this view is represented in two positions.
Figure 19:
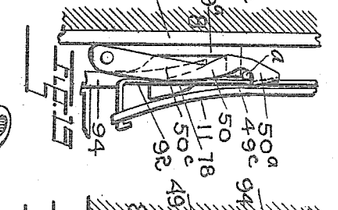
Figure 20:
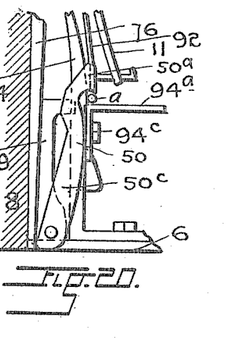
Figures 21, 22, 23, 24, 25, 26, 27:
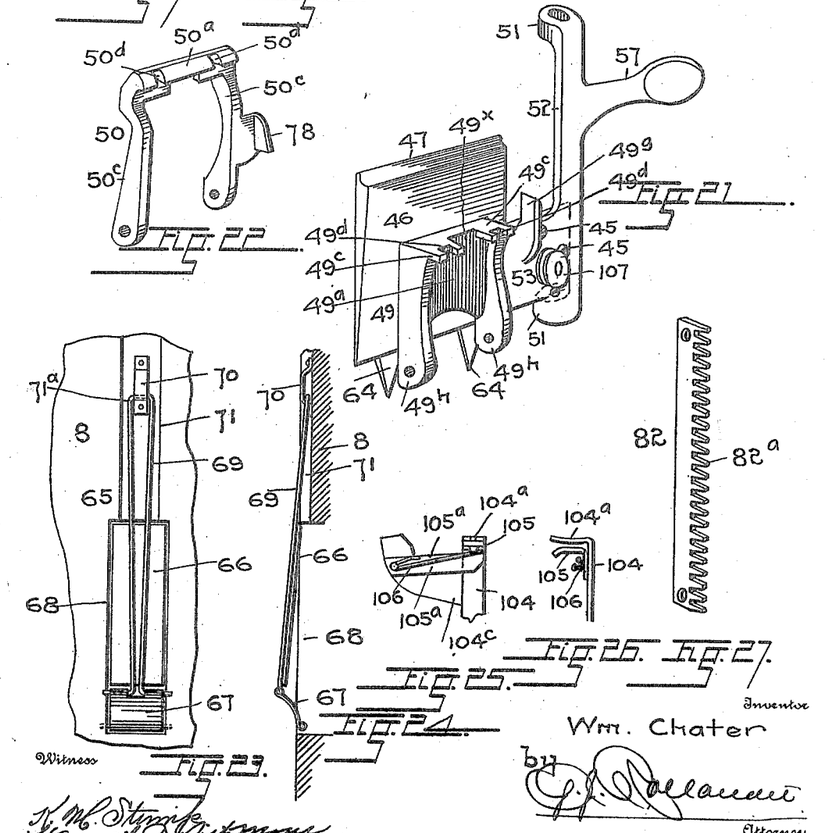
Fig. 21, a perspective view of the sliding carriage, the movable jaw being omitted.
Fig. 22, a perspective view of the detached movable jaw of the sliding carriage.
Fig. 23, an enlarged view of the tripping device employed to remove superfluous matches from the carriage.
Fig. 24, a side view thereof.
Figs. 25 and 26, respectively, plan and side views of the match-gripping extremity of the serving-arm.
Fig. 27, a perspective view of the detached igniting-bar, and Fig. 28 a detail of the detached igniter.

The removal of the match from the carrier is accomplished through instrumentality of an upwardly-pointing tapering prong 94, which projects from base 6 parallel to and in front of standard 7. Prior to the carrier reaching its lowermost position, Fig. 19, the prong, entering the recess 49ˣ between projections 49ᶜ of member 49, engages the rear edge of the fulcrumed jaw 50, which being thus forced forward slides the match off the stationary jaw 49ᶜ against springs 92, in which position it moves farther downward until the lower extremity of the springs is reached, when the burning match is free to drop, Fig. 20, to subsequently be removed by hand or by mechanical means, as will now be described. It should be observed that when the handle 57 is released and the carrier once more moves upward another match is carried along to be deposited in between the jaws of member 44 of the carrier, so that after the first match has been used there will at all times be one in readiness, and it consequently requires but one operation to procure a burning match. Rigidly secured to base 6 a short distance from the main frame is a bearing-plate 95, having an upwardly-extending spindle 96, which pivotally supports a bell-crank lever 97, and a journal 98, through which extends a vertically-disposed crank-shaft 99. One of the arms 97ª of bell-crank 97 connects with the crank-arm 99ª, at the lower extremity of spindle 99, by means of a link 100, while a connecting-rod 101 connects the other arm of lever 97 with the lower extremity of the before-mentioned inwardly-curving lever 21, the opposite extremity of which is fulcrumed at 20 to the extension 18ª of brace 18. Rigidly secured to the upper extremity of spindle 99 is a forwardly-extending rod 102, the opposite outer end of which supports the gripping device 103, purported to secure the burning match deposited between its lips. The length of the serving-arm 102 is such that when through instrumentality of the system of connected levers it is moved inwardly the end of grip 103 will engage the recessed face of prong 94 in position to receive the match held between the movable jaw 50 and springs 92. Grip 103 consists of a small plate 104, terminating in an upwardly-extending lip 104ª and having a projection 104ᶜ, which pivotally supports the extension 105ª of the movable lip 105, which coöperates with the stationary one to grip and hold the match while it is served. A spring 106, engaging lip 105, tends to hold the two lips in their normal or closed position. The upper edges of the lips are bent outwardly to facilitate introduction of the match. The serving apparatus thus described is operated through instrumentality of a small antifriction-wheel 107, rotatably secured to plate 53, which connects member 49 and arm 52 of the sliding carriage. Wheel 107, the periphery of which is grooved, is adapted to engage lever 21, the inwardly-curving inner edge of which extends in its path. When the carrier is at the top of frame 7, the serving-arm 102 is in its outward position, as shown in Fig. 14, and wheel 107 is out of engagement with lever 21. The moment the carriage descends, however, the wheel, contacting with the inner edge of lever 21, forces the latter outwardly, which movement, through instrumentality of bell-crank lever 97, crank-spindle 96, and the connecting arm and link, causes the extremity of the serving-arm to move toward the recessed prong 94, which it engages an instant prior to the carriage reaching its lowermost position. (See broken-line position, Fig. 14.) The match, which, as explained, was held between the movable jaw 50 on the carriage and springs 92, has at this period entered the space between lips 104$^a$ and 105, the stationary one of which occupies the recess in the prong. When the carriage ascends and wheel 107 has passed the curved portion of lever 21, arm 102, carrying the burning match, returns to its original position, impelled by a spring 108, one extremity of which is secured to a projection 109 on spindle 99, while its opposite end is fastened to base 6 at 110 and which was extended during the inward movement of arm 102. To insure the contact between lip 104$^a$ and prong 94 and to permit downward movement of the carrier after said lip has entered the recess in the prong, as well as upward movement thereof after the match has been deposited, a coil-spring 112 is interposed between the arm of bell-crank 97 and the adjacent end of connecting-rod 101, which allows arm 21 to move outwardly when wheel 107, ascending, passes along its inwardly-curving edge without affecting the position of rod 102. To support grip 103 while the match is deposited between its lips, prong 94 has been provided with a forwardly-extending platform 94$^a$, secured thereto by a bolt 94$^c$.

Throughout the views wherever a match has been shown to more clearly illustrate the operation of the device same has been designated by the letter "$a$."

Figure 1:
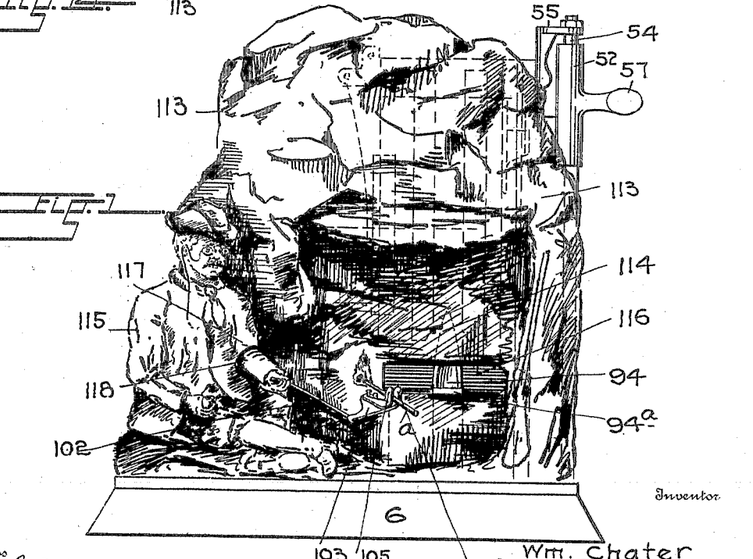
Figure 1 represents a front view of the device, showing the ornamental front, which for obvious reasons has been omitted from the other views.
Figures 2, 2B:
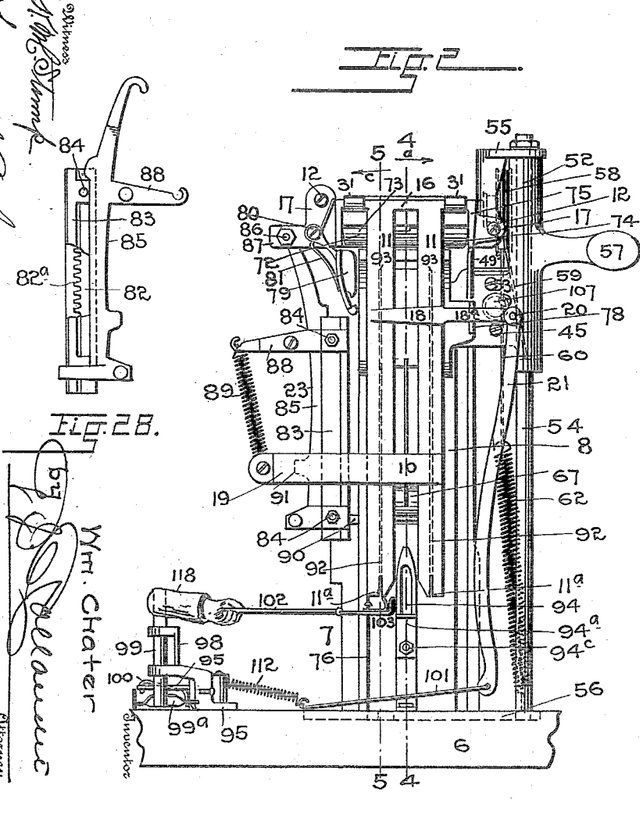
Fig. 2, a front view of the operating mechanism.
Figure 3:
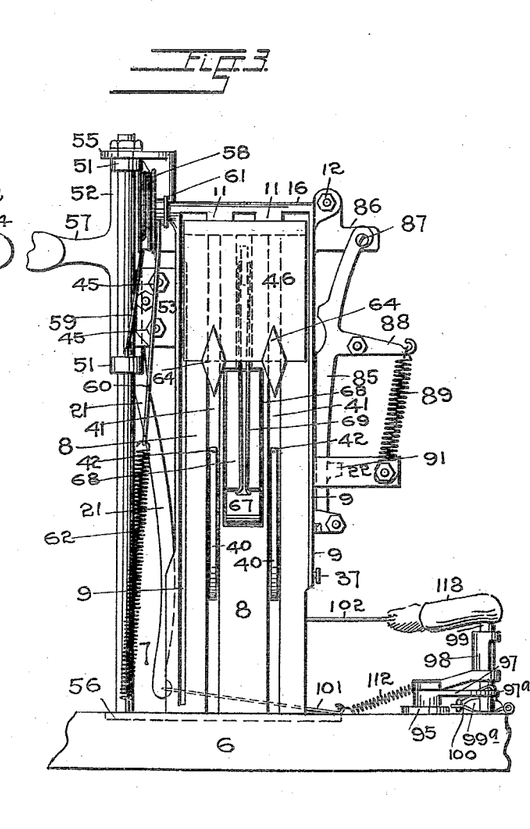
Fig. 3, a rear elevation thereof, the match-receptacle being omitted.
Figures 4, 5, 15, 16:
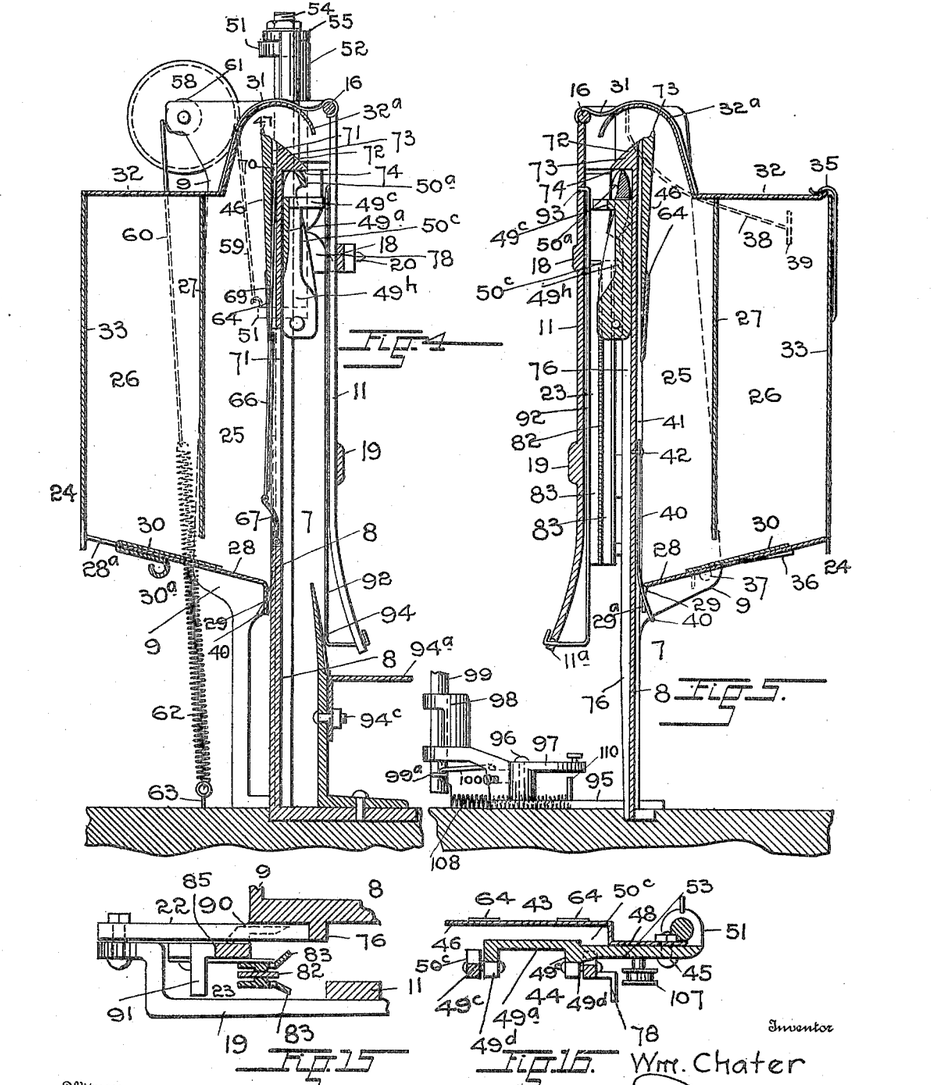
Figures 6, 7:
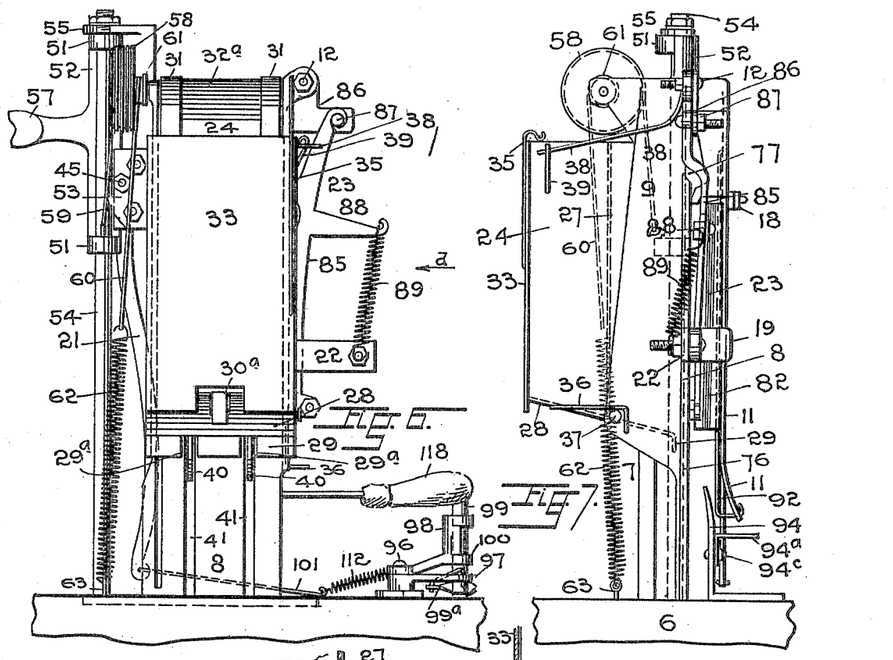
* Fig. 6, a rear elevation of the device.
Fig. 7, a side elevation thereof looking in the direction of arrow *d.

To carry out the object of my device—viz., to produce the figure of an animated being simulating the act of procuring a burning match and offering the same to the operator—arm 102 is harmoniously fashioned to represent part of said figure, preferably a limb, holding the match-gripping device. The alto-rilievo front 113, which conceals the operating mechanism of my device, as shown in Figs. 1 and 14, and which is rigidly secured on base 6, represents a mountain scene in the middle of which is a grotto or cave 114, while on the right is a human figure 115 in the garb of a hunter. An aperture or slot 116 affords access to prong 94 and is of sufficient length and width to admit the grip 103, as well as to permit the burning match deposited therein to pass outwardly. The serving-rod 102 projects in front of the figure through a suitable opening 117, sufficiently large to permit its movement, and is in this case modeled to represent the forearm 118 of figure 115, holding in its hand a rod, to the end of which grip 103 is secured.

When it is desired to procure a light, the operator takes hold of handle 57, which projects beyond front 113, and presses it down rapidly. By the operation of the mechanism described the hunter (represented by the figure 115) appears to thrust the end of the rod he holds in his hand into the mouth 94 of the grotto, to bring it out a moment later (when the pressure on handle 57 is released) with a burning match held at the end of the rod, which he simulates to offer the operator.

It will be readily understood that this novel and highly-ornamental device may be varied in appearance to suit circumstances by changing the design of front 113. It may, for instance, be modeled to become the record of some popular or historical event or it may be used for advertising purposes by representing the trade-mark of a brand of cigars or other articles of manufacture, and I wish it understood that aside from the various mechanical features of my device I claim to be the first to produce a miniature figure representing an animated being which through instrumentality of a concealed mechanical contrivance by a single movement of the operator will procure and serve a burning match.

Having thus described my invention, what I claim is—

1. A device of the class named, comprising a base, a standard thereon, a match-receptacle movably connected to said standard, a plate having a vertical reciprocating movement between the standard and the receptacle, and adapted to hold during its upward movement a match deposited thereon from said receptacle, a carrying device secured to said plate, means to transfer a match from the plate to said carrier, an igniter on said standard adapted to engage the head of the match during downward movement of the carrier, and means to transmit the burning match from said carrier into a suitable receptacle.

2. A device of the class named comprising a base, a plate vertically erected thereon, a match-receptacle vertically divided into two communicating compartments, movably secured to said plate, springs on said plate adapted to space the receptacle from the plate and to engage the matches contained in the inner compartment, a spring adapted to insure the contact between the receptacle and the springs, and a vertically-reciprocating carriage including a plate adapted to pass between the springs and the thereby-engaged matches, and to hold and elevate one of the latter.

3. A device of the class named comprising a base, a standard, having an inclined plane at its upper extremity, erected thereon, a match-receptacle on said frame, a vertically-reciprocating carriage comprising two members respectively disposed on opposite sides of said standard, one of said members having a stationary and a movable jaw, means to recede the latter when the carriage is in its uppermost position to permit a match deposited on the inclined plane to fall onto the stationary jaw, and means to project and hold the movable jaw over the match during downward movement of the carriage.

4. A device of the class named comprising a base, a standard thereon, a match-receptacle on said standard, a vertically-reciprocating carriage, including a match-elevating member and a match-lowering member, respectively disposed on opposite sides of the standard, means to transfer a match from the receptacle onto the first-named member, means to subsequently transmit said match from said member onto the opposite member, and an igniter, including a serrated plate, yieldingly mounted on said standard and adapted to engage the head of a match held by the second member during downward movement of the carriage.

5. A device of the class named comprising a base, a standard thereon, a match-receptacle on said standard, a vertically-reciprocating carriage, including a match-elevating member and a match-lowering member, respectively disposed on opposite sides of the standard, means to transfer a match from the receptacle onto the first-named member, means to subsequently transmit said match from said member onto the opposite member, an igniter including a serrated plate detachably mounted on said standard and adapted to engage the head of a match held by the carrier during its downward movement, and means to bring said head in alinement with the serrated edge of said plate.

6. A device of the class named comprising a base, a standard thereon, a match-receptacle on said standard, a reciprocating carriage, comprising a match-elevating member and a member having a stationary and a movable jaw, said members being disposed on opposite sides of the standard, means to pass a match from the receptacle onto the elevating member, means to transmit a match from the latter in between the jaws, and springs on said standard adapted to engage said match to limit its forward movement during downward movement of the carriage.

7. A device of the class named comprising a base, a standard thereon, a match-receptacle on said standard, a vertically-reciprocating carriage including match-elevating and match-lowering members, means to pass a match from the receptacle onto the first-named member, means to transmit the match from said member onto the match-lowering member, means on said standard to ignite said match during downward movement of the carriage, and means to disengage the burning match from the carriage and deposit it onto a suitable receptacle.

8. A device of the class named comprising a base, a standard thereon, a match-receptacle on said standard, a vertically-reciprocating member, comprising a match-elevating member and a member having a stationary and a movable jaw, means to transfer a match from said receptacle onto the elevating member, means to transmit the match from said member onto the stationary jaw in engagement with the movable one, igniting means adapted to engage said match during downward movement of the carriage and a prong adapted to engage said movable jaw and by bringing it forward, transmit the match from the stationary jaw into a suitable receptacle.

9. The combination with a base, a match-receptacle mounted thereon, mechanical means to extract a match from said receptacle, means to subsequently ignite said match, and means to deposit same, of a gripping appliance movably mounted on said base and adapted to receive and hold the deposited match, and means to move said appliance to a point remote from the place of deposit.

10. In combination, a base, a standard thereon, a match-receptacle on said standard, a vertically-reciprocating carrier adapted to extract and remove a match from the receptacle, means to ignite said match, means to remove said match from the receptacle, a gripping appliance capable to receive and hold the removed match and convey it to a point remote from said standard, and means to operate said appliance through the action of said carrier.

11. In combination, a base, a standard thereon, a match-receptacle on said standard, a vertically-reciprocating carrier adapted to extract and remove a match from the receptacle, means to ignite said match, means to remove said match from the receptacle, an arm pivotally mounted on said base and having match-holding means at its outer extremity, normally remote from said standard, means to bring said extremity toward the standard during downward movement of the carrier and to return it to its normal position when the carrier moves upward.

12. In combination, a base, a standard thereon, a match-receptacle on said standard, a vertically-reciprocating carrier adapted to extract and remove a match from the receptacle, means to ignite said match, means to remove said match from the receptacle, an arm pivotally mounted on said base and having match-holding means at its outer extremity, normally remote from said standard, a lever fulcrumed on the standard, a bell-crank lever mounted on the base and operatively connected with said lever and said arm, means on the carrier to operatively engage the lever on the standard and a spring on said arm adapted to yieldingly hold it in its normal position.

13. The combination with a base, a match-receptacle supported thereon and mechanical means to extract and remove a match from said receptacle, ignite the same and deliver the burning match, of the figure of an animated being mounted on said base, one of its limbs being movable and carrying a match-holding appliance normally remote from said receptacle, and means to coöperatively operate said mechanical means and said limb to cause the latter to receive and serve the burning match.

In testimony whereof I have affixed my signature in presence of two witnesses.

WILLIAM CHATER.

Witnesses:
G. J. ROLLANDET,
K. H. STUMP.